(12) United States Patent
Shukla

(10) Patent No.: US 11,891,552 B2
(45) Date of Patent: Feb. 6, 2024

(54) WEATHER PROOF PRESSURE SENSITIVE ADHESIVE TAPE COMPOSITION AND A PROCESS FOR PRODUCTION THEREOF

(71) Applicant: Ashok Shukla, Noida (IN)

(72) Inventor: Ashok Shukla, Noida (IN)

( * ) Notice: Subject to any disclaimer, the term of this patent is extended or adjusted under 35 U.S.C. 154(b) by 0 days.

(21) Appl. No.: 17/284,444

(22) PCT Filed: Jun. 12, 2019

(86) PCT No.: PCT/IN2019/050450
§ 371 (c)(1),
(2) Date: Apr. 10, 2021

(87) PCT Pub. No.: WO2020/075179
PCT Pub. Date: Apr. 16, 2020

(65) Prior Publication Data
US 2021/0340410 A1    Nov. 4, 2021

(30) Foreign Application Priority Data
Oct. 11, 2018 (IN) .............................. 201811038582

(51) Int. Cl.
*C09J 7/38* (2018.01)
*C09J 7/29* (2018.01)
(52) U.S. Cl.
CPC ................ *C09J 7/385* (2018.01); *C09J 7/29* (2018.01); *C09J 2433/00* (2013.01); *C09J 2483/006* (2013.01)

(58) Field of Classification Search
CPC . C09J 7/385; C09J 7/29; C09J 2433/00; C09J 2483/006
See application file for complete search history.

(56) References Cited

U.S. PATENT DOCUMENTS

| | | | | |
|---|---|---|---|---|
| 4,877,528 A | * | 10/1989 | Friesen | B01D 67/0093 96/10 |
| 4,963,438 A | * | 10/1990 | Weitemeyer | C09D 183/06 427/515 |
| 5,171,638 A | * | 12/1992 | Ozaki | C08F 283/124 428/447 |
| 2005/0130278 A1 | * | 6/2005 | Mitsuhashi | C12P 17/04 435/254.22 |
| 2021/0340410 A1 | * | 11/2021 | Shukla | C09J 7/29 |
| 2022/0054520 A1 | * | 2/2022 | Morishima | A61P 27/02 |
| 2022/0315685 A1 | * | 10/2022 | Liu | C08K 3/26 |
| 2022/0323628 A1 | * | 10/2022 | Zhu | A61L 2/28 |
| 2023/0041417 A1 | * | 2/2023 | Brun | G01N 33/5091 |

* cited by examiner

*Primary Examiner* — Kevin R Kruer

(57) ABSTRACT

There is provided a weather proof pressure sensitive adhesive tape composition having 15 years or more dwell time in ambient conditions, comprising ambient humidity in the range of RH 30% to 100% RH including aggressive under water conditions, ambient pressures in the range of 0.75 bar to 1.5 bar at normal temperature, ambient temperature in the range of (–) 30° C. to 75° C. at normal pressure, ambient acidity and alkalinity in the range of pH 4.5 to pH 10.5 in water, ambient salinity of water in under water conditions of up to 1.2 mole equivalent of sodium chloride and ambient surface fluid resistance of up to $2.7 \times 10^{-3}$ cubic meter per second per meter contact edge of the tape.

7 Claims, 1 Drawing Sheet

WEATHER PROOF PRESSURE SENSITIVE ADHESIVE TAPE COMPOSITION AND A PROCESS FOR PRODUCTION THEREOF

TECHNICAL FIELD

Embodiments of the present invention relate generally to adhesive tapes and more specifically, to a weather proof and highly water proof pressure sensitive adhesive tape composition and a process for production thereof.

BACKGROUND ART

There are a number of pressure sensitive adhesive tapes known in the art and are used for a number of purposes. However, the solutions available in the art suffer from a number of shortcomings. Especially such adhesive tapes are not able to cope up with requirements of extreme conditions such as under water conditions, water flow over conditions, contaminated water (acidic, alkaline or salty and turbid water), excessive environmental humidity, sudden temperature variations and desired longevity.

Therefore, considering the short comings of the existing arts as above, there is need for a weather proof highly, water proof pressure sensitive adhesive tape capable of withstanding chemical contaminations in water. Such a pressure sensitive adhesive composition and a process for production thereof, which does not suffer from above mentioned deficiencies is disclosed herein.

OBJECT OF THE INVENTION

An aspect of the present invention provides for the fulfilment of the need of a weather proof and highly water proof pressure sensitive adhesive tape composition having 15 years or more dwell time without performance failure in extreme ambient conditions as mentioned in BACKGROUND above.

Another aspect of the present invention provides a process for the production of a pressure sensitive adhesive tape including the adhesive composition as per the art being disclosed here.

SUMMARY OF THE INVENTION

According to a first aspect of the present invention, there is provided a weather proof and highly water proof pressure sensitive adhesive tape composition having 15 years or more dwell time without performance failure in extreme ambient conditions, comprising ambient humidity in the range of RH30% to 100% RH including under water conditions, ambient pressures in the range of 0.75 bar to 1.5 bar at normal temperature, ambient temperature in the range of (−) 30 degree C. to 75 degree Celsius at normal pressure, ambient acidity and alkalinity in the range of pH 4.5 to pH 10.5 in water, ambient salinity of water in under water conditions of up to 1.2 mole equivalent of sodium chloride and ambient surface fluid resistance of up to 2.7×10−3 cubic meter per second per meter contact edge of the tape.

In accordance with an embodiment of the present invention, the pressure sensitive adhesive tape comprises a substrate layer or the main carrier body or the flexible substrate body may be any of the substrates, not necessarily of water proof nature, like a layer, in transparent or coloured form, of various compositions, including but not limited to, along with cotton, as well as non-woven fabrics of similar materials, of (i) Ethyl Vinyl Acetate and one or multiple polymers of poly ethylenes, or (11) A thick or thin film of Poly Vinyl Chloride, or (ii) A thick or thin film of Poly Ethylene Terephthalate (PET) or other terephthalates, or (iv) A thick or thin layer of foam of Ethylene Propylene Diene Terpolymer (EPDM), or (v) A thick or thin layer of Butyl Rubber, or (vi) A thick or thin layer of Neoprene Rubber or any other flexible tape substrate like (vii) Cross Linked Poly Ethylene Foam or (viii) Poly Urethane Foam or (ix) Expanded Poly Ethylene Foam Film or (x) One side silicon coated aluminium foil etc.

In accordance with another embodiment the substrate layer is treated by at least one non-resinous polyorganosiloxane (molecular structure pictured as below, to help increase wetting tension of the substrate), as a co-binding layer, or the surface to which the PSA layer is to be coated.

In accordance with a further embodiment the substrate layer after being coated with the co-binding layer may be subjected as necessary to heretofore known surface treatments like corona discharge treatment, plasma treatment, UV-ray irradiation, acid treatment, alkali treatment, anti-static treatment or primer coating (variable, depending upon the substrate thickness, type and desired tape characteristics as well as the type of primer blend) as mentioned forthwith.

These treatments may be provided to increase the anchoring of the PSA layer to the substrate co-binding layer comprising a non-resinous polyorganosiloxane on one or both sides of the substrate layer to be coated with pressure sensitive adhesive layer and a pressure sensitive adhesive layer contiguous with the co-binding layer comprising a crosslinker, an acrylate terminated with hydroxyl group, obtained by reacting the acrylate with superheated partially ionized steam post coating in the presence of at least one catalyst.

In accordance with an embodiment of the present invention, the weight/weight ratio of the substrate layer to the co-binding layer is in the range of 1:0.06 to 1:4.5, and the weight/weight ratio of the substrate layer to the pressure sensitive adhesive layer is in the range of 1:1.5-1:4.5.

In accordance with an embodiment of the present invention, the substrate layer comprises a mechanically arranged polymer, not necessarily of water proof nature, selected from the group consisting of ethyl vinyl acetate foam, non-woven fabrics of one or multiple polymers of polyethylenes, viscose, non-woven fabric, cotton and other materials having a thickness in the range of 0.5 mm-10 mm, one or multi-layer film of polyvinyl chloride, polyethylene terephthalate (PET) or other terephthalates having a thickness in the range 12 micron-120 micron, foam of ethylene propylenediene terpolymer (EPDM) having a thickness in the range 2 mm-10 mm, butyl rubber, neoprene rubber or other rubber/s having a thickness in the range of 1 mm-5 mm, crosslinked or expanded polyethylene foam or a combination thereof of having a thickness in the range of 2 mm10 mm, reticulated or non-reticulated polyol (polyester based or Urethane based) polyurethane foam, having a thickness in the range of 3 mm-20 mm, one side silicon coated aluminium foil having a thickness in the range of 20 micron-100 micron, and combinations thereof.

In accordance with an embodiment of the present invention, the non-resinous polyorganosiloxanes have a molecular weight in the range of 2000 to 20000.

In accordance with an embodiment of the present invention, the non-resinous polyorganosiloxanes have a molecular weight in the range of 4000 to 10000.

In accordance with an embodiment of the present invention, the acrylates have a molecular weight in the range of 400 to 5000.

In accordance with an embodiment of the present invention, the acrylates have a molecular weight in the range of 1000 to 5000.

In accordance with an embodiment of the present invention, the coated pressure sensitive adhesive layer includes at least one solvent selected from the group consisting of ethyl acetate, toluene, hexane, isopropyl alcohol, pentanedione, and combinations thereof in varying ratio according to substrate, thickness and desired characteristics of each side of the tape.

In accordance with an embodiment of the present invention, the catalyst comprises a Lewis Acid, or a primary, secondary or tertiary organic amine, or a metal oxide, or a titanium compound, or a tin compound, or a zirconium compound, or combinations thereof in varying ratio according to substrate, thickness and desired characteristics of each side of the tape.

According to a second aspect of the present invention, there is provided a process for the production of a pressure sensitive adhesive tape composition comprising the steps of preparing a substrate layer, applying the substrate layer with a co-binding layer comprising a non-resinous polyorganosiloxane by a coating technique and drying the substrate layer and the co-binding layer to obtain an application base, treating the application base through surface treatments mechanisms comprising corona discharge treatment, plasma treatment, UV-ray irradiation, acid treatment, alkali treatment, anti-static treatment or primer coating, and combinations thereof; coating a pressure sensitive adhesive composition comprising an acrylate on the application base through a coating technique, obtained by way of Solvent Based Vapour reactive technique while avoiding foaming and mechanical breakdown of adhesive layer; passing the coated product to a reaction chamber, facilitating reaction of the surface layer of the coated PSAC with a condensation reactable hydroxyl (OH) group present in superheated water vapour (due to partial ionization of superheated steam), and solvent removal through drying the pressure sensitive tape composition post coating.

In accordance with an embodiment of the present invention, the substrate layer comprises a mechanically arranged polymer, not necessarily of water proof nature, selected from the group consisting of ethyl vinyl acetate foam, non-woven fabrics of one or multiple polymers of polyethylenes, viscose, non-woven fabric, cotton and other materials having a thickness in the range of 0.5 mm-10 mm, one or multi-layer film of polyvinyl chloride, polyethylene terephthalate (PET) or other terephthalates having a thickness in the range 12 micron 120 micron, foam of ethylene propylenediene terpolymer (EPDM) having a thickness in the range 2 mm-10 mm, butyl rubber, neoprene rubber or other rubber/s having a thickness in the range of 1 mm-5 mm, crosslinked or expanded polyethylene foam or a combination thereof of having a thickness in the range of 2 mm-10 mm, reticulated or non-reticulated polyol (polyester based or Urethane based) polyurethane foam, having a thickness in the range of 3 mm-20 mm, one side silicon coated aluminium foil having a thickness in the range of 20 micron-100 micron, and combinations thereof.

In accordance with an embodiment of the present invention, the non-resinous polyorganosiloxanes have a molecular weight in the range of 2000 to 20000.

In accordance with an embodiment of the present invention, the non-resinous polyorganosiloxanes have a molecular weight in the range of 4000 to10000.

In accordance with an embodiment of the present invention, the acrylates have molecular weight in the range of 400 to 5000.

In accordance with an embodiment of the present invention, the coating process is selected from the group consisting of three roller techniques, gravure coater, reverse roll coater, kiss coater, dip roll coater, bar coater, knife coater, spray coater, and combinations thereof.

In accordance with an embodiment of the present invention, the coating process is a three roller technique.

DETAILED DESCRIPTION OF THE PREFERRED EMBODIMENTS

Figure 1:
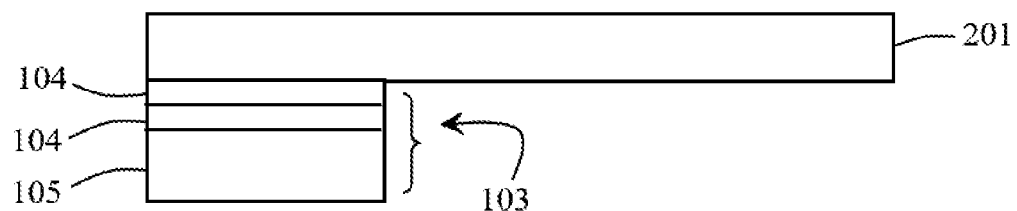
FIG. 1 illustrates single side tape structure.

While the present invention is described herein by way of example using embodiments and illustrative drawings, those skilled in the art will recognize that the invention is not limited to the embodiments of drawing or drawings described and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive "purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present invention.

It is not suggested or represented that any or all of these matters form part of the prior art base or were common general knowledge in the field relevant to the present invention.

In this disclosure, whenever a composition or an element or a group of elements is preceded with the transitional phrase "comprising", it is understood that we also contemplate the same composition, element or group of elements with transitional phrases "consisting of", "consisting", "selected from the group of consisting of, "including", or "is" preceding the recitation of the composition, element or group of elements and vice versa.

In the context of the specification, the term "polymer" refers to any organic resin whose melting point cannot be specified and only Vicat Softening Point can be specified.

In the context of the specification, "PSAC" refers to pressure sensitive adhesive composition.

In the context of the specification, "highly water proof" for the purpose of explanation of this art are to be used here as a standard definition where the product remains unaffected post assembly under water without any kind of protective layer for prolonged dwell time periods of minimum 15 years or more under extreme conditions of (−) 30 degree Centigrade to 75 degree centigrade temperature and water having of up to 1.2 mole salinity equivalent of sodium chloride, alkalinity up to 10.5 pH, acidity up to 4.5 pH, 0.75 bar to 1.5 bar pressure and 1.5 meter per second fluid flow adjacent to the product surface under normal radiation and magnetic environment (not being specified for the purpose of simplicity).

In the context of the specification, the term "adhesive tape" refers to all flexible and flat structures along with coating of a pressure sensitive adhesive, on one side or both sides, such as films or film sections which are expanded in two dimensions, of extended length with varying widths as per manufacturing sizes or customised needs, sections or patterns of such a flat structure obtained through die cutting, also in the form of printed or embossed or other processed labels using the base materials of the tape or other similar or non-similar shapes not specified here, and to include continuous web in the form of core wound tapes, also rolled on itself in case of double sided tapes.

The term "adhesive tape" in the sense of this invention encompasses all flat structures along with coating of a pressure sensitive adhesive, on one side or both sides, such as films or film sections which are expanded in two dimensions, tapes of extended length and limited width, strip sections, die-cuts, labels and the like. Preferably, the adhesive tape is present as a continuous web in the form of a roll.

In the context of the specification, the term "substituted" refers to one or more hydrogen atoms in a hydrocarbon group that has been replaced with another substituent. Examples of such substituents include, but are not limited to, hydroxyl group, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms: nitrogen atom containing groups such as amino-functional groups, amido-functional groups, and cyano-functional groups; sulfur atoms; and sulfur atom containing groups such as mercapto.

In the context of the specification, the term "gsm" refers to grams per square meter coating in wet or dry form as the case may be, or the substrate film weight, or the final product weight per square meter area in grams.

Ambient conditions comprise the prevailing atmospheric and weather conditions, including but not limited to humidity, temperature, and pressure, in the immediate surroundings.

Normal temperature and pressure comprise a temperature of 20° C. (293.15 K, 68° F.) and an absolute pressure of 1 atm (14.696 psi, 101.325 kPa).

The present invention is described hereinafter by various embodiments with reference to the accompanying drawing, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only and are not intended to limit the scope of the claims. In addition, a number of materials are identified as suitable for various facets of the implementations. These materials are to be treated as exemplary and are not intended to limit the scope of the invention.

In an embodiment of the present invention, there is provided a weather proof and highly water proof pressure sensitive adhesive tape composition having 15 years or more dwell time in ambient conditions, comprising: (a) ambient humidity in the range of RH 30% to 100% RH including aggressive under water conditions; (b) ambient pressures in the range of 0.75 bar to 1.5 bar at normal temperature; (c) ambient temperature in the range of (−) 30° C. to 75° C. at normal pressure, (d) ambient acidity and alkalinity in the range of pH 4.5 to pH 10.5 in water; (e) ambient salinity of water in under water conditions of up to 1.2 mole equivalent of sodium chloride; and (f) ambient surface fluid resistance of up to $2.7 \times 10\%$ cubic meter per second per meter contact edge of the tape. Preferably, the pressure sensitive adhesive comprises a dwell time in the range of 15-18 years, or 15-21 years or more preferably at least 15 years without exhibiting any deterioration of the adhesive properties and weather resistant properties.

Within the lifespan of at least 15 years, the pressure sensitive adhesive tape is resistant to humidity in the range of RH 15-30%, or RH 30-50%, or RH 70-100% or more including underwater conditions. As the application of the tape described herein is suitably adapted for underwater use, it may be used at a pressure in the range of 0.6 bar to 0.9 bar, 0.9 bar to 1.5 bar, 1.5 bar to 2.1 bar, or preferably in the range of 0.75 to 1.5 bar. It is also applicable in a temperature in the range of −35° C. to 105° C. or −30° C. ta 90° C., or preferably in the range of −30° C. to 75° C. The pressure sensitive tape is preferably used at a pH in the range of pH 4.5 to pH 10.5, or pH 4.5 to pH 7, or pH 7 to pH 10:5.

According to another embodiment, the pressure sensitive adhesive tape acquires the properties of superior dwell time under a range of ambient conditions described herein as it comprises a pressure sensitive adhesive layer comprising at least one acrylate terminated with a hydroxyl group. The pressure sensitive layer is obtained by reacting the acrylate with superheated partially ionized steam. The free hydroxyl radicals impregnate the adhesive layer and cause the pressure sensitive layer to become water saturated in such way so as while not losing the property of self-adhesion, the final product is not affected by water molecules even in the extreme conditions of 100% RH meaning surrounding water (i.e., submerged condition) in even high temperature ambient containing water vapours, at least up to the temperature when hydroxyl molecules detach themselves from the polymer (which may comprise conditions of up to 90° C. and vapour pressure lower than 0.75 bars or higher than 1.5 bar). Further the pressure sensitive adhesive tape comprises a substrate layer comprising a polymer; a co-binding layer of a non-resinous polyorganosiloxane, treated with surface treatment method(s) as described, onto which is coated the pressure sensitive adhesive layer. The coating of the co-binding layer as well as the surface treatment may be on one or both sides of the substrate, and therefore the pressure sensitive tape may be used as both a single sided tape and a double-sided tape.

The pressure sensitive adhesive product prepared by the present invention maybe used in ambient conditions where excessive humidity may prevail at all times, including submerged applications like the bottom of boats, washing machines, weather exposed street lights and so on, indicated as water proof here, with the meaning that the adhesion of the tape with the materials it has been adhered to shall not be affected post assembly or wire wrapping or any other application even if any part of the tape or adhesive layer coated on to it can be directly exposed to water under normal temperature, pressure or chemical conditions as well as under extreme conditions as specified, without any extra water insulating or protective layer for the specified period of underwater dwell time. Even in the case of where the tape has been used, without any other protective layer except the tape itself, and allowing thickness sides of the tape or apart of the unused tape to be exposed to being submerged in water as per specified extreme conditions of temperature, pressure or chemical nature, the performance of the tape and its adherence is not affected.

In an embodiment of the present invention, there is provided a pressure sensitive tape comprising: (a) a substrate layer; (b) a co-binding layer comprising a non-resinous polyorganosiloxane on one or both sides of the substrate layer and, (c) a pressure sensitive adhesive layer contiguous with the co-binding layer comprising a crosslinker, acrylates terminated with hydroxyl group, obtained by reacting the acrylate with superheated partially ionized steam post coating in the presence of at least one catalyst.

In a further embodiment, the pressure sensitive tape comprises: (a) a substrate layer; (b) a co-binding layer comprising a non-resinous polyorganosiloxane on one or both sides of the substrate layer to be coated with pressure sensitive adhesive layer; and, (c) a pressure sensitive adhesive layer contiguous with the co-binding layer comprising a crosslinker, acrylates terminated with hydroxyl group, obtained by reacting the acrylate with superheated partially ionized steam post coating in the presence of at least one catalyst, wherein weight/weight ratio of the substrate layer to the co-binding layer is in the range of 1:0.6 to 1:4.5, and the weight/weight ratio of the substrate layer to the pressure sensitive adhesive layer is in the range of 1:1.5-1:4.5.

In another embodiment, the weight/weight ratio of the substrate layer to the co-binding layer is in the range of 1:0.8-1:4, or 1:0.7:1:3, or 1:0.6 to 1:4, and the weight/weight ratio of the substrate layer to the pressure sensitive adhesive layer is in the range of 1:1.5-1:4.0, or 1:1.6-1:3.5, or 1:1.5-1:3.

In a further embodiment, the pressure sensitive tape comprises: (a) a substrate layer; (b) a co-binding layer comprising a non-resinous polyorganosiloxane on one or both sides of the substrate layer to be coated with pressure sensitive adhesive layer; and, (c) a pressure sensitive adhesive layer contiguous with the co-binding layer comprising a cross-linker, acrylates terminated with hydroxyl group, obtained by reacting the acrylate with superheated partially ionized steam post coating in the presence of at least one catalyst, wherein the substrate layer comprises a mechanically arranged polymer, not necessarily of water proof nature, selected from the group consisting of ethyl vinyl acetate foam, non-woven fabrics of one or multiple polymers of polyethylenes, viscose, cotton and other materials having a thickness in the range of 0.5 mm-10 mm, one or multi-layer film of polyvinyl chloride, polyethylene terephthalate (PET) or other terephthalates having a thickness in the range 12 micron-120 micron, foam of ethylene propylenediene terpolymer (EPDM) having a thickness in the range 2 mm-10 mm, butyl rubber, neoprene rubber or other rubber/s having a thickness in the range of 1 mm-5 mm, crosslinked or expanded polyethylene foam or a combination thereof of having a thickness in the range of 2 mm-10 mm, reticulated or non-reticulated polyol (polyester based or Urethane based) polyurethane foam, having a thickness in the range of 3 mm-20 mm, one side silicon coated aluminium foil having a thickness in the range of 20 micron-100 micron, and combinations thereof.

In an embodiment of the present invention, there is provided a pressure sensitive tape comprising: (a) a substrate layer; (b) a co-binding layer comprising a non-resinous polyorganosiloxane on one or both sides of the substrate layer to be coated with pressure sensitive adhesive layer; and, (c) a pressure sensitive adhesive layer contiguous with the co-binding layer comprising a crosslinker, acrylates terminated with hydroxyl group, obtained by reacting the acrylate with superheated partially ionized steam post coating in the presence of at least one catalyst, wherein the non-resinous polyorganosiloxane is represented by the general formula:

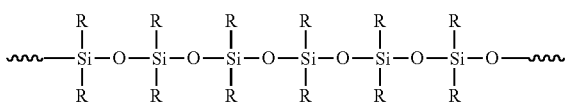

wherein,

R is individually selected from substituted or unsubstituted radicals such as a monovalent alkyl or cycloalkyl radical having from 2 to 12 carbon atoms, a substituted alkyl radical having from 2 to 12 carbon atoms, a vinyl radical, a phenyl radical, a substituted phenyl radical, and combinations thereof.

The polyorganosiloxane polymer may comprise polyalkylsiloxane copolymer segments. The copolymer segments are generally a polyalkylsiloxane in which the alkyl groups contain from one to six carbon atoms, particularly preferred is methyl as the alkyl group. The polyalkylsiloxane copolymer segments used to form the polymer may be difunctional to obtain linear segmented or block copolymers, and monofunctional to obtain graft copolymers or certain block copolymers. The polyalkylsiloxane generally contains reactive group(s) such as those selected from vinyl, hydroxy, mercapto, amino, carboxy or the like.

Additionally, the non-resinous polyorganosiloxanes have a molecular weight in the range of 2000 to 20000, more preferably in the range of 4000 to 10000.

In another embodiment of the present invention, the pressure sensitive adhesive tape comprises a pressure sensitive adhesive layer, wherein the composition of the adhesive layer comprises a crosslinker, acrylates terminated with hydroxyl group, obtained by reacting the acrylate with superheated partially ionized steam, post coating, in the presence of at least one catalyst.

The pressure sensitive layer described herein comprises an acrylate terminated with a condensation reactable group comprising a hydroxyl group, obtained by reacting the acrylate with superheated partially ionized steam.

The acrylate of the pressure sensitive adhesive layer has a molecular weight in the range of 400 to 5000, or 1000 to 5000, or 2000 to 5000, or 2000 to 4000. Further, the acrylate described comprises polymers, co-polymers such as methyl, ethyl, and propyl acrylates as well as longer chain acrylates including tetradecyl acrylates, and including both primary and secondary, normal and branched chain alkyl esters, polymers and co-polymers of acrylic acid and acrylic acid derivatives, salts of acrylic acid and derivatives thereof, conjugate bases of acrylic acid and derivatives thereof, and combinations thereof.

The acrylate of the pressure sensitive layer described herein, is terminated with a hydroxyl group by means of Solvent Based Vapour Reactive Technique, comprising reacting the acrylate with high temperature water vapour, comprising free hydroxyl (OH) radicals, impregnating the adhesive layer and thereby causing the changes required in the solidifying pressure sensitive adhesive composition and in becoming water saturated in such way so as while not losing the property of self-adhesion.

In another embodiment of the present invention, the pressure sensitive adhesive tape comprises additives which contribute to the tape the special properties like color of the tape, anti-fungal or medicinal or UV Resistance and other such additional optional properties, for specific purposes intended, but without altering the chemical nature or causing disturbances in the intermolecular forces of the tape composition, so that none of the adhesive properties, including "water proofing capability" is compromised and special properties are obtained. Such additives comprise compounds such as primary and secondary antioxidants, fillers, flame retardants, pigments like carbon black, titanium dioxide, calcium carbonate, zinc carbonate or glass or polymer fibres, full or hollow bodies of glass or polymer fibres such as microballoons, zinc oxide, silicates or silica, UV absorbers, antiozonants, metal deactivators, sun screen, photoinitiators, crosslinkers or crosslinking promoters. It has to be ensured that the amount of all additives added, besides adhesive formulations, post reaction, does not exceed 3%, otherwise inter molecular forces fatigue shall give way to post assembly moisture permeation in the final product which is unwanted.

In an embodiment of the present invention, there is provided a process for the production of a pressure sensitive adhesive tape composition comprising the steps of: (a) preparing a substrate layer; (b) applying the substrate layer with a co-binding layer comprising a nonresinous polyorganosiloxane by a coating technique and drying the substrate layer and the co-binding layer to obtain an application base; (c) treating the application base through surface treatments mechanisms comprising corona discharge treatment, plasma treatment, UV-ray irradiation, acid treatment, alkali treatment, antistatic treatment or primer coating, and combinations thereof, (d) coating a pressure sensitive adhesive composition comprising an acrylate on the application base through a coating technique, obtained by way of Solvent Based Vapour reactive technique while avoiding foaming and mechanical breakdown of adhesive layer; (e) passing the coated product to a reaction chamber, facilitating reaction of the surface layer of the coated PSAC with a condensation reactable hydroxyl (OH) group present in superheated water vapour (due to partial ionization of superheated steam), (f) solvent removal through drying the pressure sensitive tape composition post coating.

In a further embodiment, the substrate layer comprising one or more polymers is first prepared as per the intended application. The thickness and the material of the substrate layer are chosen as per the intended use. The co-binding layer is then applied onto the substrate layer by means of a coating technique. The coating technique may be one or more of a three roller techniques, gravure coater, reverse roll coater, kiss coater, dip roll coater, bar coater, knife coater, spray coater, and combinations thereof, to obtain an application base to receive a pressure sensitive adhesive composition that forms the pressure sensitive adhesive layer. In some embodiments, the co-binding layer may be applied on both sides of the substrate layer, thereby resulting in double-sided tape. The application base so obtained-single sided or double-sided is then treated using surface treatment mechanisms comprising corona discharge treatment, plasma treatment, UV-ray irradiation, acid treatment, alkali treatment, antistatic treatment or primer coating, and combinations thereof. This assists in the binding and adherence of the pressure sensitive adhesive composition onto the application base.

Before application onto the application base, the pressure sensitive adhesive is preferably filtered before immediate application, to prevent any small particles from causing a disruption in the layer formation, or possibly catching the lamination-cum-nipping head, which might result in a continuous line of low or no adhesive.

The application of the pressure sensitive adhesive composition is preferably performed using Three Roller Technique. The technique is suited to control the layer dimension (or the thickness of the adhesive), where by the thickness of the "coated" layer of the adhesive at the first point is controlled by two shear rollers moving in the opposite direction at the point of adhesive contact, in such a way that while the first roller picks up the adhesive blend from the tray, the second roller picks it up from the first roller, and the third roller then picks up the adhesive from the second roller, again by shear mechanism, moving in the opposite direction at the point of contact of the adhesive with roller 2, and by manipulation of speed of this third roller, the final adhesive layer thickness (or grams per square meter density) is maintained. The adhesive thickness is thus controllable at double point each offering a variability of up to 15 times from minimum to maximum, thus giving the mechanism a desired accuracy of 1 in 6 to 224.

The pressure sensitive adhesive composition can also be applied with other known methods or existing arts such as gravure coater, reverse roll coater, kiss coater, dip roll coater, bar coater, knife coater, spray coater or a combination thereof for subsequent multiple coatings (i.e., coatings one after the other to achieve multiple properties of different chemistries in addition to the art disclosed here). The pressure sensitive adhesive layer is typically formed continuously, depending upon the purpose, application and coating thickness requirement, or also in a regular or random pattern of dots, stripes or any other configuration required as per the intended application. Preferably, the coated product is placed on a paper base. The coated siliconized release paper is sent to a third roller in such a way that the final product is actually transferred on to a substrate from the second roller.

The coated product so obtained using the Solvent Based Vapour Reactive Technique described herein is then further processed in a reaction chamber in the presence of super-heated water vapours comprising free hydroxyl radicals that are highly reactive. The super-heated water vapours may have a temperature of at least 150° C., more preferably within the range of 150° C. to 300° C. Further, the process as described herein also comprises reacting the pressure sensitive adhesive layer with superheated partially ionized steam in the presence of at least one catalyst selected from the group consisting of a Lewis Acid, or a primary, secondary or tertiary organic amine, or a metal oxide, or a titanium compound, or a tin compound, or a zirconium compound, and combinations thereof. In a case otherwise, water vapours along with free radicals of OH type shall cross over the adhesive blend layer and react with paper, thereby deteriorating the layer of the release material (silicon compound) of the paper which is an unwanted situation.

Further, the reaction conditions optionally comprise solvent selected from the group consisting of ethyl acetate, toluene, hexane, isopropyl alcohol, pentanedione, and combinations thereof in varying ratio according to substrate, thickness and desired characteristics of each side of the tape.

The pressure sensitive adhesive tape so obtained is then sent to dryer in such a way that it has minimum tension (sufficient only to maintain the paper layer without sag) so that rapid drying is possible to apply. It is so because after drying, the paper shrinks naturally and the tension increases. The typical value of the feed tension (or Tension Zone −2) maintained is in the range of 8 to 10 grams per mm of web width. The tension in other zones, not CTPQ (Critical to Process Quality) can be anywhere between 20 to 40 grams per mm of web width, depending upon release material and thickness (e.g., paper varying from 80 GS to 130 GSM or polyester film from 12 micron to 75 micron, or BOPP release Film from 15 micron to 30 micron etc.). Rapid drying can be applied by hot air method or even infrared method also, so that water and/or solvent content can be reduced rapidly. Water/solvent vapour release can be between 0.005 mg to 0.010 mg per square mm.

A parallel thickness control device, especially for low weight coating tapes for economical applications or where higher thickness may not be allowed due to space constraint of the place where the tape is to be applied may also be used. Preferably, a Mayer Bar Coater, and specially so where one layer of the adhesive is to be permanently stuck with the substrate and it is not an adhesive transfer product (e.g. self-release aluminium tapes instead of silicon release coated paper for adhesive transfer). In this method, an excess coating is applied on the surface of the substrate through applicator rollers rotating in the bath of the adhesive blend. The coating is then doctored by the wire wound bar, known as Mayer Bar, and the amount of coating being allowed to remain is determined by the gauge of the wire used while winding the Mayer Bar. This results in the flooded first nip, and the excess adhesive blend is wiped by a wiping device, which is needed to prevent the coating bead from forming along the edge of the web being coated.

The Mayer Bar used is of smaller diameter than other rollers (typically 25 mm to 32 mm) and the diameter of the Mayer Bar depends upon the viscosity of the blend prepared, which in turn depends upon the substrate type and adhesive coating thickness requirement.

INDUSTRIAL APPLICATION

The present invention relates to a pressure sensitive adhesive tape and process of production thereof. The pressure sensitive tape describes herein is both water proof and weather proof and ideal for extreme ambient conditions of extremely low to very high temperatures, pressures, very low moisture (lower than RH 30%) to extremely high moisture (100% RH and more, i.e., under water conditions for a dwell time for up to 15 years, and finds applications including washing machine, ship and boat bottom and other marine applications, weather exposed lighting, low to high atmospheric pressures and all types of underwater applications from alkalinity to salinity to acidic waters. The application may also be adapted for specific use by the incorporation of additives into the pressure sensitive adhesive composition. The adhesive tape may therefore be adapted for use in wound healing, enzymatic reactions and associated testing procedures, food packaging and testing, among others.

Figure 2:
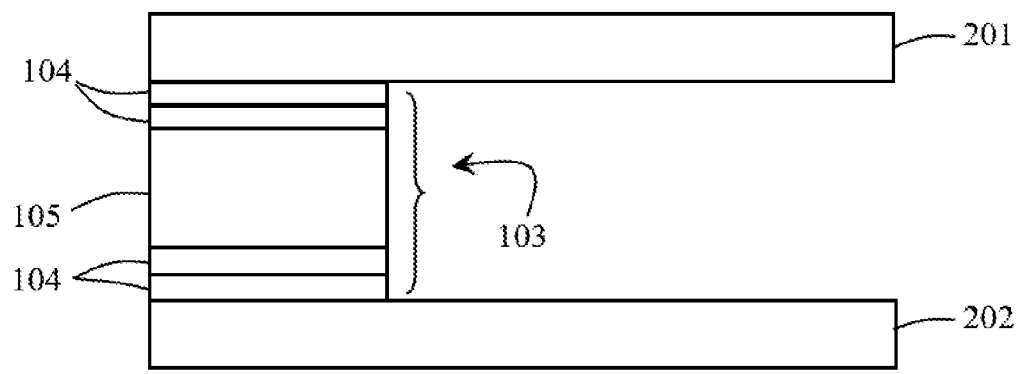
FIG. 2 illustrates double side tape structure.

FIG. 1 & FIG. 2 provide illustration for Single Side Tapes and double side tapes respectively. The tape (103) has surface substrates or parts thereof (201, 202) where the tape is to stick. In FIG. 1; the tape (103) comprises a single surface substrate (201) with a single set of adhesive layer(s) (104) on top of the tape substrate (105).

In FIG. 2, the tape (103) comprises two surface substrates or parts thereof (201 and 202) with two sets of adhesive layers (104) at top and bottom the tape substrate (105).

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may vary.

Experiment 1

Test Results—Peel Adhesion Testing Before Immersion in Water for Substrate of Ethyl Vinyl Acetate and One or Multiple Polymers of Polyethylene The test method was based on a Test method similar to ASTM C794 Standard Test Method for Adhesion Peel off of Self Adhesive Tape with a primed stainless steel screen substrate having a width of 15 mm and a roughness average of 5 micron+/−1. The steel substrate on which the tape is to be tested is prepared by first cleaning with isopropanol. The tape is applied to a flexible PET Film and the same is fixtured to the steel substrate with a specified pressure and dwell time, in such a manner that the double sided tape is sticking to both the flexible PET film and the steel substrate. The releasing on the tape has to be removed before application of the tape. The resulting assembly, and the Test Sample for peel off strength testing, is then placed in a Universal test Machine in such a way that while free end of the PET Film is fixed in the upper jaw, the lower free end of the steel strip is fixed in the lower jaw. After clamping the sample, the second portion of the assembly is held in left hand in such a way that, at all times, the PET Film, fixed in the upper jaw, makes an approximate angle between 100 to 110 degrees with the steel strip.

The machine is then started. The pull speed should be fixed at about 200 mm per second. The sample is pulled for a total of approximately 60 mm. The force in grams and % cohesive failure are recorded. 5 sets of test samples are cut in such away that there are five test samples cut from each tape randomly selected, in parts "A" (for test to be done before water immersion), "B" (for test to be done post normal water immersion), "C" (for the test to be done post saline water immersion), "D" (for test to be done post alkaline water immersion), and "E" (for test to be done post acidic water immersion) (Table 1). The tests are then performed as explained above.

TABLE 1

| S. No. | Test Sample | Max Peel Strength in Grams | % Cohesive Failure (approx.) |
|---|---|---|---|
| 1 | S 1 A | 2760 | 24% |
| 2 | S 2 A | 3063 | 19% |
| 3 | S 3 A | 2949 | 27% |
| 4 | S 4 A | 2850 | 23% |
| 5 | S 5 A | 3120 | 18% |

Experiment 2

Test Results—Peel Adhesion Testing after Immersion in Water for substrate of Ethyl Vinyl Acetate and one or multiple polymers of polyethylene (normal water). Second parts of same test samples, i.e. S 1 B through S$5 B are then prepared and immersed in water with TDS of 300+/−60 and pH Value of 6.9+/−03 (i.e. normal tap water easily available). Temperature of the water post immersion is to be maintained at 27 degree C.+/−3 degree C. (typical normal room temperature) for first 4 hours, then to be kept in freezing condition and allowed to freeze between negative 10 degree C. (temperature measured at the beginning of the freezing cycle of the chamber) to negative 23 degree C. (temperature measured at the end of the freezing cycle, standard domestic freezer used to perform this test part, as the only equipment being available) for the second 4 hours, and then heating the container having the water and samples immersed in it, and maintained temperature of 75+/−15 degree C. by repeated heating method. After completion of these 3 cycles of total of 12 hours, the test method as explained in Experiment 1 is then repeated on the 5 test samples S 1 B through S 5 B (Table 2).

TABLE 2

| S. No. | Test Sample | Max Peel Strength in Grams | % Cohesive Failure (approx.) |
|---|---|---|---|
| 1 | S 1 B | 2463 | 25% |
| 2 | S 2 B | 2850 | 18% |
| 3 | S 3 B | 2871 | 29% |
| 4 | S 4 B | 2910 | 24% |
| 5 | S 5 B | 3021 | 18% |

Experiment 3

Test Results—Peel Adhesion Testing after Immersion in Water for substrate of Ethyl Vinyl Acetate and one or multiple polymers of polyethylene (saline water). Third parts of same test samples, i.e. S 1 C through S 5 C are then prepared and immersed in water with 1.2+/−0.03 mole salinity. To prepare the solution, 58.5 grams of Sodium Chloride of normal purity available in standard laboratory chemical shops is dissolved in distilled water and this solution is to be taken as the "test water". Temperature of the test water post immersion is to be maintained at 27 degree C.+/−3 degree C. (typical normal room temperature) for first 4 hours, then to be kept in freezing condition and allowed to freeze between negative 10 degree C. (temperature measured at the beginning of the freezing cycle of the chamber) to negative 23 degree C. (temperature measured at the end of the freezing cycle, standard domestic freezer used to perform this test part, as the only equipment being available) for the second 4 hours, and then heating the container having the test water and samples immersed in it, and maintained temperature of 75+/−15 degree C. by repeated heating method for 4 hours. After completion of these 3 cycles of total 12 hours, the test method as explained in Experiment 1 is then repeated on the 5 test samples S 1 C through S 5 C (Table 3).

TABLE 3

| S. No. | Test Sample | Max Peel Strength in Grams | % Cohesive Failure (approx.) |
|---|---|---|---|
| 1 | S 1 C | 2382 | 26% |
| 2 | S 2 C | 2550 | 21% |
| 3 | S 3 C | 2772 | 27% |
| 4 | S 4 C | 2760 | 23% |
| 5 | S 5 C | 2850 | 22% |

Experiment 4 t

Test Results—Peel Adhesion Testing after Immersion in Water for Substrate of Ethyl Vinyl Acetate and One or Multiple Polymers of Polyethylene (Alkaline Water).

Fourth parts of same test samples, i.e. C 1 D through 5 D (Table 4) are then prepared and immersed in alkaline water with pH Value of 10.5. To prepare the solution, anhydrous Sodium Hydroxide of normal purity available in standard laboratory chemical shops is dissolved in distilled water in a slow manner and stirred so as to allow the exothermic heat of the process of dissolution to escape. The pH is repeatedly tested by a standard pH meter. As the pH reaches 10.5+/−0.3, the addition of Sodium Hydroxide is to be stopped and this solution is to be taken as the "test water". Temperature of the test water post immersion is to be maintained at 27 degree C.+/−3 degree C. (typical normal room temperature) for first 4 hours, then to be kept in freezing condition and allowed to freeze between negative 10 degree C. (temperature measured at the beginning of the freezing cycle of the chamber) to negative 23 degree C. (temperature measured at the end of the freezing cycle, standard domestic freezer used to perform this test part, as the only equipment being available) for the second 4 hours, and then heating the container having the test water and samples immersed in it, and maintained temperature of 75+/−15 degree C. by repeated heating method for 4 hours. After completion of these 3 cycles of total 12 hours, the test method as explained in Experiment 1 is then repeated on the 5 test samples S 1 D through S 5 D

TABLE 4

Test results of Experiment 4 for Parts "D"

| S. No. | Test Sample | Max Peel Strength in Grams | % Cohesive Failure (approx.) |
|---|---|---|---|
| 1 | S 1 D | 2352 | 25% |
| 2 | S 2 D | 2520 | 18% |
| 3 | S 3 D | 2760 | 24% |
| 4 | S 4 D | 2793 | 21% |
| 5 | S 5 C | 2940 | 24% |

Experiment 5

Test Results—Peel Adhesion Testing after Immersion in Water for Substrate of Ethyl Vinyl Acetate and One or Multiple Polymers of Polyethylene (Acidic Water).

Fifth parts of same test samples, i.e., S 1 E through S 5 E (Table 5) are then prepared and immersed in acidic water with pH Value of 4.5. To prepare the solution, anhydrous sulphuric acid of normal purity available in standard laboratory chemical shops is dissolved in distilled water in a slow manner and stirred so as to allow the exothermic heat of the process of dissolution to escape. The pH is repeatedly tested by a standard pH meter. As the pH reaches 4.5+/−0.3, the addition of sulphuric acid is to be stopped and this solution is to be taken as the "test water". Temperature of the test water post immersion is to be maintained at 27 degree C.+/−3 degree C. (typical normal room temperature) for first 4 hours, then to be kept in freezing condition and allowed to freeze between negative 10 degree C. (temperature measured at the beginning of the freezing cycle of the chamber) to negative 23 degree C. (temperature measured at the end of the freezing cycle, standard domestic freezer used to perform this test part, as the only equipment being available) for the second 4 hours, and then heating the container having the test water and samples immersed in it, and maintained temperature of 75+/−15 degree C. by repeated heating method for 4 hours. After completion of these 3 cycles of total 12 hours, the test method as explained in Experiment 1 is then repeated on the 5 test samples S 1 E through S 5 E (Table 5).

TABLE 5

Test results of Experiment 5 for Parts "E"

| S. No. | Test Sample | Max Peel Strength in Grams | % Cohesive Failure (approx.) |
|---|---|---|---|
| 1 | S 1 E | 2340 | 24% |
| 2 | S 2 E | 2640 | 19% |
| 3 | S 3 E | 2709 | 23% |
| 4 | S 4 E | 2820 | 27% |
| 5 | S 5 E | 2880 | 24% |

Experiment 6

Test Results—Peel Adhesion Testing Before Immersion in Water for Substrate of Poly Vinyl Chloride Film The test method was based on a Test method similar to ASTM C794 Standard Test Method for Adhesion Peel off of Self-Adhesive Tape with a primed stainless steel screen substrate having a width of 15 mm and a roughness average of 5 micron+/−1. The steel substrate on which the tape is to be tested is prepared by first cleaning with isopropanol. The tape is applied to a flexible PET Film and the same is fixed to the steel substrate with a specified pressure and dwell time, in such a manner that the double-sided tape is sticking to both the flexible PET film and the steel substrate. The releasing on the tape has to be removed before application of the tape. The resulting assembly, our Test Sample for peel off strength testing, is then placed in a Universal test Machine in such a way that while free end of the PET Film is fixed in the upper jaw, the lower free end of the steel strip is fixed in the lower jaw. After clamping the sample, the second portion of the assembly is held in left hand in such a way that, at all times, the PET Film, fixed in the upper jaw, makes an approximate angle between 100 to 110 degrees with the steel strip.

The machine is then started. The pull speed should be fixed at about 200 mm per second. The sample is pulled for a total of approximately 60 mm. The force in grams and % cohesive failure are recorded. 5 test samples are cut in such a way that there are five test samples cut from each tape randomly selected, in parts "A" (for test to be done before water immersion), "B" (for test to be done post normal water immersion), "C" (for the test to be done post saline water immersion), "D" (for test to be done post alkaline water immersion), and "E" (for test to be done post acidic water immersion) (Table 6). The tests are then performed as explained above.

TABLE 6

Test results of Experiment 6 Parts "A"

| S. No. | Test Sample | Max Peel Strength in Grams | % Cohesive Failure (approx.) |
|---|---|---|---|
| 1 | S 1 A | 2490 | 21% |
| 2 | S 2 A | 2970 | 21% |
| 3 | S 3 A | 2850 | 27% |
| 4 | S 4 A | 2820 | 22% |
| 5 | S 5 A | 2805 | 23% |

Experiment 7

Test Results—Peel Adhesion Testing after Immersion in Water for Substrate of Poly Vinyl Chloride Film (Normal Water)

Second parts of same test samples, i.e., S 1 B through S 5 B are then prepared and immersed in water with TDS of 300+/−60 and pH Value of 6.9+/−0.3 (i.e., normal tap water easily available). Temperature of the water post immersion is to be maintained at 27 degree C.+/−3 degree C. (typical normal room temperature) for first 4 hours, then to be kept in freezing condition and allowed to freeze between negative 10 degree C. (temperature measured at the beginning of the freezing cycle of the chamber) to negative 20 degree C. (temperature measured 4 the end of the freezing cycle, standard domestic freezer used to perform this test part, as the only equipment being available) for the second 4 hours, and then heating the container having the water and samples immersed in it, and maintained temperature of 75+/−15 degree C. by repeated heating method. After completion of these 3 cycles of total of 12 hours, the test method as explained in Experiment 6 is then repeated on the 5 test samples S 1 B through S 5 B (Table 7).

TABLE 7

Test results of Experiment 7 for Parts "B"

| S. No. | Test Sample | Max Peel Strength in Grams | % Cohesive Failure (approx.) |
|---|---|---|---|
| 1 | S 1 B | 2349 | 24% |
| 2 | S 2 B | 2850 | 28% |
| 3 | S 3 B | 2781 | 23% |
| 4 | S 4 B | 2520 | 30% |
| 5 | S 5 B | 2670 | 27% |

Experiment 8

Test Results—Peel Adhesion Testing after Immersion in Water for Substrate of Poly Vinyl Chloride (Saline Water)

Third parts of same test samples, i.e., S 1 C through S 5 C are then prepared and immersed in water with 1.2+/−0.03 mole salinity. To prepare the solution, 58.5 grams of Sodium Chloride of normal purity available in standard laboratory chemical shops is dissolved in distilled water and this solution is to be taken as the "test water". Temperature of the test water post immersion is to be maintained at 27 degree C.+/−3 degree C. (typical normal room temperature) for first 4 hours, then to be kept in freezing condition and allowed to freeze between negative 10 degree C. (temperature measured at the beginning of the freezing cycle of the chamber) to negative 23 degree C. (temperature measured at the end of the freezing cycle, standard domestic freezer used to perform this test part, as the only equipment being available) for the second 4 hours, and then heating the container having the test water and samples immersed in it, and maintained temperature of 75+/−15 degree C. by repeated heating method for 4 hours. After completion of these 3 cycles of total 12 hours, the test method as explained in Experiment 6 is then repeated on the 5 test samples S 1 C through S 5 C (Table 8).

TABLE 8

Test results of Experiment 8 for Parts "C"

| S. No. | Test Sample | Max Peel Strength in Grams | % Cohesive Failure (approx.) |
| --- | --- | --- | --- |
| 1 | S 1 C | 2240 | 27% |
| 2 | S 2 C | 2472 | 26% |
| 3 | S 3 C | 2670 | 25% |
| 4 | S 4 C | 2589 | 26% |
| 5 | S 5 C | 2769 | 28% |

Experiment 9

Test Results—Peel Adhesion Testing after Immersion in Water for Substrate of Poly Vinyl Chloride Film (Alkaline Water)

Fourth parts of same test samples, i.e. S 1 D through S 5 D (Table 9) are then prepared and immersed in alkaline water with pH Value of 10.5. To prepare the solution, anhydrous Sodium Hydroxide of normal purity available in standard laboratory chemical shops is dissolved in distilled water in a slow manner and stirred so as to allow the exothermic heat of the process of dissolution to escape. The pH is repeatedly tested by a standard pH meter. As the pH reaches 10.5+/−0.3, the addition of Sodium Hydroxide is to be stopped and this solution is to be taken as the "test water". Temperature of the test water post immersion is to be maintained at 27 degree C.+/−3 degree C. (typical normal room temperature) for first 4 hours then to be kept in freezing condition and allowed to freeze between negative 10 degree C. (temperature measured at the beginning of the freezing cycle of the chamber) to negative 23 degree C. (temperature measured at the end of the freezing cycle, standard domestic freezer used to perform this test part, as the only equipment being available) for the second 4 hours, and then heating the container having the test water and samples immersed in it, and maintained temperature of 75+/−15 degree C. by repeated heating method for 4 hours. After completion of these 3 cycles of total 12 hours, the test method as explained in Experiment 6 is then repeated on the 5 test samples S 1 D through S 5 D (Table 9).

TABLE 9

Test results of Experiment 9 for Parts "D" Experiment 10:

| S. No. | Test Sample | Max Peel Strength in Grams | % Cohesive Failure (approx.) |
| --- | --- | --- | --- |
| 1 | S 1 D | 2241 | 24% |
| 2 | S 2 D | 2556 | 27% |
| 3 | S 3 D | 2568 | 26% |
| 4 | S 4 D | 2523 | 28% |
| 5 | S 5 C | 2646 | 27% |

Test Results— Peel Adhesion Testing after Immersion in Water for Substrate of Poly Vinyl Chloride Film (Acidic Water)

Fifth parts of same test samples, i.e., S 1 E through S 5 E (Table 10) are then prepared and immersed in acidic water with pH Value of 4.5. To prepare the solution, anhydrous sulphuric acid of normal purity available in standard laboratory chemical shops is dissolved in distilled water in a slow manner and stirred so as to allow the exothermic heat of the process of dissolution to escape. The pH is repeatedly tested by a standard pH meter. As the pH reaches 4.5+/−0.3, the addition of sulphuric acid is to be stopped and this solution is be taken as the "test water". Temperature of the test water post immersion is to be maintained at 27 degree C.+/−3 degree C. (typical normal room temperature) for first 4 hours, then to be kept in freezing condition and allowed to freeze between negative 10 degree C. (temperature measured at the beginning of the freezing cycle of the chamber) to negative 23 degree C. (temperature measured at the end of the freezing cycle, standard domestic freezer used to perform this test part, as the only equipment being available) for the second 4 hours, and then heating the container having the test water and samples immersed in it, and maintained temperature of 75+/−15 degree C. by repeated heating method for 4 hours. After completion of these 3 cycles of total 12 hours, the test method as explained in Experiment 6 is then repeated on the 5 test samples S 1 E through S 5 E.

TABLE 10

Test results of Experiment 10 for Parts "E"

| S. No. | Test Sample | Max Peel Strength in Grams | % Cohesive Failure (approx.) |
| --- | --- | --- | --- |
| 1 | S 1 E | 2229 | 26% |
| 2 | S 2 E | 2346 | 25% |
| 3 | S 3 E | 2373 | 28% |
| 4 | S 4 E | 2283 | 27% |
| 5 | S 5 E | 2526 | 24% |

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claims.

I claim:

1. A waterproof and weatherproof pressure sensitive adhesive tape comprising:
   a. a substrate layer;
   b. a co-binding layer comprising a polyorganosiloxane on one or both sides of the substrate layer to be coated with a pressure sensitive adhesive layer; and
   c. the pressure sensitive adhesive layer contiguous with the co-binding layer comprising a crosslinker and an acrylate, terminated with a reactable group comprising a hydroxyl group that is obtained by reacting the acrylate with a superheated partially ionized steam in the presence of a catalyst after the coating of the substrate layer, wherein the hydroxyl group of the acrylate impregnates the pressure sensitive adhesive layer to solidify a pressure sensitive adhesive composition of the pressure sensitive adhesive layer.

2. The pressure sensitive tape of claim 1, wherein the pressure sensitive tape is a single sided tape or a double-sided tape such that the ratio of weight of the substrate layer to the co-binding layer is in the range of 1:0.6 to 1:4.5, and the ratio of the weight of the substrate layer to the pressure sensitive adhesive layer is in the range of 1:1.5-1:4.5.

3. The pressure sensitive tape of claim 1, wherein the substrate layer is selected from the group consisting of:
   a) ethyl vinyl acetate foam, polyethylene, viscose, or cotton having a thickness in the range of 0.5 mm-10 mm;
   b) a film of polyvinyl chloride having a thickness in the range 12 microns-120 microns;
   c) a foam of ethylene propylenediene terpolymer (EPDM) having a thickness in the range 2 mm-10 mm;
   d) butyl rubber or neoprene rubber having a thickness in the range of 1 mm-5 mm;
   e) crosslinked polyethylene foam having a thickness in the range of 2 mm-10 mm;
   f) reticulated polyol (polyester based) having a thickness in the range of 3 mm-20 mm; and
   g) one side silicon coated aluminium foil having a thickness in the range of 20 microns-100 microns.

4. A process for the production of a pressure sensitive adhesive tape composition comprising the steps of:
   a. preparing a substrate layer;
   b. coating the substrate layer with a co-binding layer comprising a polyorganosiloxane by a coating technique and drying the substrate layer and the co-binding layer to obtain an application base;
   c. treating the application base through surface treatments mechanisms comprising corona discharge treatment, plasma treatment, UV-ray irradiation, acid treatment, alkali treatment, anti-static treatment or primer coating, and combinations thereof;
   d. coating a pressure sensitive adhesive composition comprising an acrylate on the application base through a coating technique;
   e. passing the coated product to a reaction chamber, facilitating reaction of a surface layer of the coated pressure sensitive adhesive composition with a condensation reactable hydroxyl (OH) group, obtained by reacting the acrylate with superheated partially ionized steam in the presence of a catalyst; and
   f. drying the pressure sensitive tape composition.

5. The process of claim 4, wherein the substrate layer comprises a polymer selected from the group consisting of ethyl vinyl acetate, ethylene and polymers thereof, poly vinyl chloride, polyethylene terephthalate (PET), ethylene propylene diene terpolymer (EPDM), butyl rubber, neoprene rubber cross-linked polyethylene foam, polyurethane foam, expanded polyethylene foam film, silicon coated aluminium foil, and combinations thereof.

6. The process of claim 4, wherein the coating technique is selected from the group consisting of three roller techniques, gravure coater, reverse roll coater, kiss coater, dip roll coater, bar coater, knife coater, spray coater, and combinations thereof.

7. The process of claim 4, wherein the coating technique is a three-roller technique.

* * * * *